3,213,056
SYNTHETIC RUBBER COMPOSITIONS STABILIZED WITH ORGANIC THIOSULPHINATE
John Payne, Burnham, England, and Joseph Patrick Brown, Llangollen, Wales, assignors to Monsanto Chemicals Limited, London, England, a British company
No Drawing. Filed Jan. 9, 1963, Ser. No. 250,242
Claims priority, application Great Britain, Jan. 10, 1962, 919/62
5 Claims. (Cl. 260—45.7)

This invention relates to synthetic rubber compositions having improved storage life.

Most unvulcanized synthetic rubbers undergo deterioration on storage unless a protective agent or stabilizer is added, and in many instances the deterioration is characterized by the formation of gel—that is regions in a rubber that have become hard and where rubbery properties have been lost. Gel formation can sometimes be observed as the hardening and cracking of the surface of a rubber.

Of the materials that have been proposed as stabilizers for unvulcanized synthetic rubbers, most of the effective ones suffer from the disadvantage that they impart a distinct, generally dark color to the rubber, so that they are not suitable for use where light-colored rubber products are required.

We have now discovered that a certain group of chemical compounds are effective stabilizers for synthetic rubbers and moreover that these compounds will not discolor the rubber to any significant extent.

The compounds are organic thiolsulphinates, and accordingly the invention comprises a synthetic rubber containing an organic thiolsulphinate as the stabilizer.

The organic thiolsulphinate can be, for example, a compound having the formula

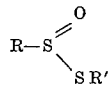

where R and R' are each an aliphatic or aromatic group.

Synthetic rubbers that can be stabilized are usually those containing ethylenic unsaturation, for example those derived from a diene. These are, in general, predominately hydrocarbon rubbers which are subject to deterioration by air or oxygen.

When aliphatic, a group R or R' in the above formula can be, for example, an alkyl group such as a methyl, ethyl, n-butyl, t-butyl, hexyl, octyl or dodecyl group; a cycloalkyl group, such as a cyclohexyl group; or an aralkyl group, such as a benzyl group.

When aromatic, a group R or R' is in general an aryl group, for example a phenyl, naphthyl or tolyl group, or one of these groups having a substituent, such as a halogen atom, a nitro group, an amino group, or an alkoxy group, in the aryl nucleus.

A preferred class of thiolsulphinates are those where both groups are aryl groups (the same or different) and specific examples of such compounds are phenyl benzenethiolsulphinate, p-tolyl p-toluenethiolsulphinate, o-nitrophenyl o-nitrobenzenethiolsulphinate, p-chlorophenyl benzenethiolsulphinate and p-ethoxyphenyl p-ethoxybenzenethiolsulphinate.

Synthetic rubbers which can be stabilized by thiolsulphinates include polymers of 1,3-butadienes, for instance of 1,3-butadiene itself or of isoprene, copolymers of 1,3-butadienes with other monomers such as for instance styrene, acrylonitrile, isobutylene or methyl methacrylate, and polyolefin rubbers, for instance ethylene-propylene copolymers. The thiolsulphinates are particularly effective stabilizers for styrene-butadiene rubbers.

The amount of the stabilizer used in the rubber can vary between wide limits, but in general it has been found preferable to use from 0.2 to 3 parts by weight and particularly from 0.5 to 2 parts by weight, per hundred parts by weight of rubber. Amounts somewhat outside these limits can sometimes be employed, for instance from 0.1 to 5 parts of the stabilizer per hundred parts of rubber. Very satisfactory results have been obtained using about 1 part by weight per hundred parts by weight of rubber.

The thiolsulphinate can be incorporated into the rubber by milling; or where the rubber is produced by an emulsion polymerization process for example, the stabilizer (generally for this purpose formulated as an emulsion) can be added to the latex before coagulation; or where the rubber is produced by polymerizing the appropriate monomer or monomers in solution, this solution can be treated with a solution of the thiolsulphinate in a suitable solvent before the solid rubber is isolated.

A synthetic rubber containing a thiolsulphinate stabilizer can if desired be vulcanized by a conventional process appropriate to the particular synthetic rubber concerned.

The invention is illustrated by the following example.

*Example*

This example illustrates the use of phenyl benzenethiolsulphinate as a stabilizer for a styrene-butadiene rubber.

The effectiveness of the stabilizer was assessed by recording the time taken for the entire surface of a sample of rubber containing the stabilizer to harden and crack, in comparison with a similar sample of rubber containing no stabilizer, and with a third containing a known stabilizer, N-isopropyl-N'-phenyl-p-phenylenediamine.

0.1 gram of phenyl benzenethiolsulphinate was milled at room temperature into 10 grams of a styrene-butadiene rubber containing no other additive. When the mixing was complete, the rubber was pressed out to a sheet having a thickness of 5 thousandths of an inch and was provided on one side with a backing of aluminum foil. Strips were cut from the laminate thus obtained and placed in an air oven at 100° C. Similar strips were prepared from a further sample of the styrene-butadiene rubber to which no antioxidant was added, and from a third sample containing 0.1 gram of N-isopropyl-N'-phenyl-p-phenylenediamine per 10 grams of rubber.

Strips were removed from the oven at intervals and the extent of degradation of the rubber was assessed by visual examination of the exposed surfaces.

Hardening of the entire surface of the control samples occurred within 4 hours, whereas the time taken for the samples containing phenyl benzenethiolsulphinate to reach the same stage was 30½ hours, thus showing the effectiveness of phenyl benzenethiolsulphinate as a stabilizer.

N-isopropyl-N'-phenyl-p-phenylenediamine was equally effective as a stabilizer, but at the end of the test the rubber containing the p-phenylenediamine had discolored to a mid-brown, while the samples containing the thiolsulphinate had the off-white color of the original rubber.

It is intended to cover all changes and modifications of the samples of the invention herein chosen for purposes of disclosure which do not constitute departures from the spirit and scope of the invention.

What is claimed is:

1. Normally oxidizable predominately hydrocarbon synthetic rubber stabilized by having admixed therewith a minor proportion effective as an antioxidant of an organic thiolsulphinate.

2. Styrene-butadiene synthetic rubber stabilized by having admixed therewith a minor proportion effective as an antioxidant of an organic thiolsulphinate of the formula

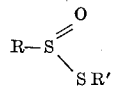

where R and R' are selected from the group consisting of alkyl, cycloalkyl, aralkyl and aryl.

3. Styrene-butadiene synthetic rubber stabilized by having admixed therewith a minor proportion effective as an antioxidant of an organic thiolsulphinate of the formula

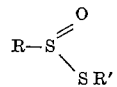

where R and R' are aryl.

4. Styrene-butadiene synthetic rubber stabilized by having admixed therewith a minor proportion effective as an antioxidant of phenyl benzenethiolsulphinate.

5. Styrene-butadiene synthetic rubber stabilized by having admixed therewith a minor proportion effective as an antioxidant of p-tolyl p-toluenethiolsulphinate.

No references cited.

MURRAY TILLMAN, *Primary Examiner.*